Aug. 2, 1932.   F. MICHELSSEN   1,870,017
PHOTOELECTRIC RELAY
Filed April 18, 1927
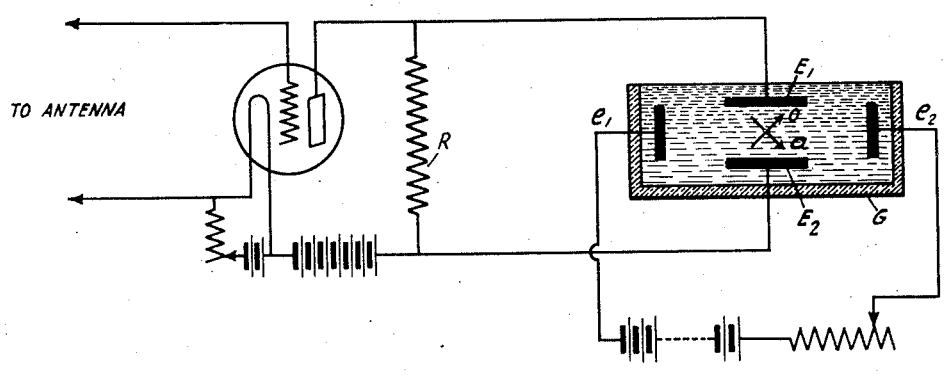
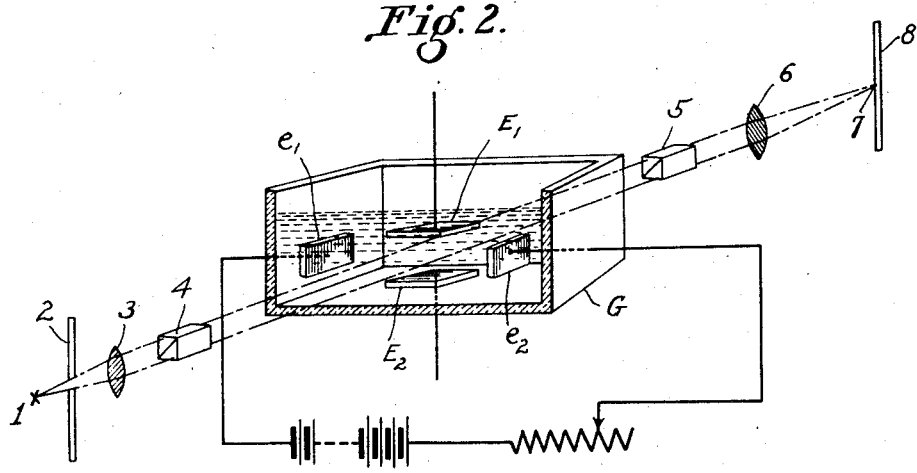
INVENTOR
FRITZ MICHELSSEN
BY
ATTORNEY Patented Aug. 2, 1932

1,870,017

UNITED STATES PATENT OFFICE

FRITZ MICHELSSEN, OF BERLIN, GERMANY, ASSIGNOR TO GESELLSCHAFT FÜR DRAHT-LOSE TELEGRAPHIE M. B. H., OF BERLIN, GERMANY, A CORPORATION OF GERMANY

PHOTOELECTRIC RELAY

Application filed April 18, 1927, Serial No. 184,616, and in Germany May 5, 1926.

A number of liquids are known, for instance the so-called liquid crystals, and further several colloidal solutions among other things, pentoxide of vanadium, which, under the influence of an electric field applied thereto or of an electric current sent therethrough, exhibit phenomena of double refraction. These liquids may therefore be called optically active, optically responsive, or birefringent liquids, since under the action of an electric field they serve to control polarized light rays. This is an action which is based upon the fact that the individual crystalline particles of the liquid, which are generally in complete disorder in relation to one another, become subject to a directional effect. The idea is self-suggesting to utilize this effect of double refraction for the creation of a photoelectric relay of the kind required, as is well known, for picture telegraphy and television, but the utilization of this double refraction effect for the purposes of a photorelay is attended with difficulties in view of the fact that the disordered arrangement of the individual particles is not restored at once when the electric field ceases to act and, therefore, such an arrangement exhibits too much inertia to be useful for practical work.

According to the present invention, this inertia or sluggishness in action may be removed by artificial means. With this end in view, an auxiliary electric field is applied which serves to orientate the constituent particles of the liquid in such a way that perfect refraction in a definite direction is permanently produced and present. The polarizer and the analyzer are then so positioned with reference to each other that darkness prevails. If, then, another electric field, that is, the control field is used which occupies an angle with relation to the direction of the electric field first mentioned, reorientation of the two axes corresponding to the ordinary and the extraordinary ray, is produced, with the result that a brightening of the field of vision occurs. As soon as the controlling field vanishes, the particles without appreciable inertia will be caused to assume a position as governor by the first or auxiliary field, with the result that darkness is restored immediately. Hence, by means of using an auxiliary field it is possible to obviate the sluggishness and to thus create a photoelectric relay which is useful for practical purposes.

For the better understanding of the underlying phenomena, reference is made to the arrangement as illustrated in the accompanying drawing, wherein Fig. 1 illustrates a preferred means of associating the electrodes with the incoming signal oscillations and the constant source of potential and Fig. 2 diagrammatically illustrates the means for passing a polarized light beam through the electrostatic fields produced within the container.

To now make reference to Fig. 1 of the drawing, G is the vessel containing the liquid that is used. $e1$, $e2$, are two electrodes to which the auxiliary potential is applied and which cause double refraction of the medium. The double refraction properties which are due to the influence of the potential applied across the electrodes $e1$ and $e2$ may be characterized by the two axes $o$ and $a$. The direction of oscillation of the incident polarized light which impinges at right angles to the plane of the drawing shall be assumed to coincide with axis $o$. Then, to be adjusted to darkness, the analyzer should allow only the oscillations in the direction of the axis $a$ to pass. Directions P and A indicate the orientation of the polarizer and the analyzer. If the two other electrodes E1 and E2, which are disposed at right angles to the pair first mentioned, are supplied with the controlling potential, then rotation of the axes $o$ and $a$ through a certain angle is occasioned with the result that light may pass through the analyzer. Hence, the effect is based upon the turning of the axis, the position of which is governed by the auxiliary field that has been applied.

By Fig. 2 of the drawing I have conventionally illustrated the manner in which the polarized light beam is passed through the container G so as to be influenced by the variable electrostatic field produced between the electrodes $E_1$, $E_2$ by incoming signal oscillations and controlled additionally by the use of the electrostatic field between the electrodes $e_1$ and $e_2$. As shown conventionally by this figure light from a source 1 is directed through a diaphragm of any desired characteristics 2 to a lens 3 where it is passed through the Nicol prism 4 and polarized in one plane. The light passing from the Nicol prism 4 may be then directed between the plates $E_1$ and $E_2$ and the variable electrostatic field produced therebetween by incoming signal pulses causes double refraction of the plane polarized beam of light issuing from the Nicol prism 4. After the light beam has been influenced and doubly refracted by the action of electrostatic field caused by the signals it is directed through a second Nicol prism 5 placed at right angles to the prism 4 so that under conditions when the beam is unaffected by signals changing the field strength between the electrodes $E_1$ and $E_2$ no light will pass beyond the Nicol prism 5. However, due to conditions when the plane polarized beam from Nicol prism 4 is doubly refracted or, as has been frequently suggested by engineers "elliptically polarized", the character of the light beam is so changed that the Nicol prism 5, arranged to polarize the beam in a plane at right angles to that of Nicol prism 4, will not cut off the light and the controlled light is, therefore, passed beyond the Nicol prism 5 through a lens 6 which directs the beam as a point source 7 upon a screen 8 of any desired character for recording.

In the form of construction indicated in the drawing, the two pairs of electrodes are so arranged and the direction of the light is so chosen that the two electrical fields are at right angles with reference to each other, while the direction of the rays in turn is also at right angles thereto, it being understood, of course, that also another direction or orientation of the electrodes may be chosen. It must be further noted that the invention is not limited to the case here illustrated where the electrodes are arranged inside the liquid, in other words, where they are in conducting relationship with the liquid, since, if desired, arrangements may be so made that the electrodes set up only one field which causes and governs the orientation of the particles occasioning double refraction without a conduction current being present at the same time. Also the orientation of the light rays may be chosen other than hereinbefore suggested, for instance, in the direction of one of the electric fields, say, the auxiliary field. One feasible scheme would be to provide one of the electrode pairs with holes through which the luminous ray is allowed to pass.

Having described my invention, I claim:—

1. A light relay system comprising, a container, a birefringent liquid within said container, means for subjecting said liquid to the action of two electric fields at an angle with respect to each other so that said liquid is rendered doubly refractive to light rays and the quality of the liquid is permanently maintained.

2. A light relay system including, a container, an optically active liquid within said container, and means for subjecting said liquid to the action of two electric fields at an angle with respect to each other, one of said fields being variable and rendering the said liquid doubly refractive to light rays and the other of said fields being of constant strength to insure accuracy of response from the liquid by the variable field.

3. A light relay system including, a container, an optically responsive liquid within said container, means for subjecting said liquid to the action of two electric fields at an angle with respect to each other, one of said fields being controlled by incoming signal oscillations for rendering said liquid doubly refractive to the passage of light rays and the other of said fields being of constant strength for instantaneously restoring said liquid to its original condition upon an interruption in signal oscillations upon said controlling field.

4. A light relay system including, a container, an optically responsive liquid within said container, means for passing a polarized beam of light through said container, a pair of electrostatic fields at an angle with respect to each other for controlling the said polarized light beam entering said container, one of said fields being controlled by incoming signal oscillations and the other of said fields being of constant strength for immediately restoring said liquid to its original condition upon an interruption of incoming signalling oscillations upon said controlling field.

5. A light relay system including, a container provided with an optically responsive liquid, means for passing a polarized light beam to be controlled therethrough, a plurality of angularly disposed electric fields for influencing the liquid in said container, one of said electric fields being constant for restoring the liquid to the original condition and the other of said electric fields being variable for rendering the liquid doubly refractive so as to control the light passing therethrough.

6. A light relay system including, a container, optically active liquid within said container, a plurality of pairs of electric fields for influencing the liquid within said container, means for directing a polarized light beam through the liquid contained in said container and subjecting said polarized light beam to the action of said electric fields, said fields being arranged at right angles to each other and one of said fields being produced by variations in received signals and the other of said fields being of constant strength for immediately restoring said liquid to its original condition upon a cessation in signals influencing said first named electric field.

7. A light relay system for controlling polarized light beams passed therethrough by electrically doubly refracting the same under the influence of an electric field which consists of a container filled with an optically active liquid, and means for subjecting the liquid to the action of two electric fields each at a predetermined angle of inclination with reference to the other, one of said fields being of constant strength and the other of said fields being of a strength varied in accordance with electric potentials for controlling the light beam passing through the liquid.

8. A light valve comprising a container through which polarized light is passed, a birefringent liquid contained within said container, means for subjecting the liquid to a plurality of electric fields at an angle with respect to each other and each at approximately ninety degrees to the path of the polarized light passing therethrough, one of said electric fields being of variable strength for rendering the liquid doubly refractive to the light rays passing therethrough and the other of said fields being of substantially constant strength to restore the liquid to its original condition due to the removal of the variable field.

9. A light valve comprising a container, a birefringent liquid contained within said container, means for subjecting the liquid within said container to the action of two electrostatic fields at an angle with respect to each other so that one of the fields renders the liquid doubly refractive to the light rays and the other of the fields maintains the quality of the liquid.

10. A light relay system comprising a container, a birefringent liquid within said container, means for subjecting the liquid within said container to the acton of two electrc fields at substantially right angles with respect to each other so that one of said fields acts to render the liquid doubly refractive to light rays passing therethrough and the other of said fields acts to insure accuracy of response from the liquid by restoring the liquid to the original condition in the absence of the other of said fields.

F. MICHELSSEN.